United States Patent [19]
Croy et al.

[11] 3,949,534
[45] Apr. 13, 1976

[54] INTERKEYED PANEL EDGE CORNER JOINT

[76] Inventors: Peter Severin Croy, Dobrastrasse 112, A 2344 Maria-Enzersdorf-Suedstadt; Rudolf Zelenka, Iglaseegasse 56, A 1190 Vienna, both of Austria

[22] Filed: Mar. 7, 1975

[21] Appl. No.: 556,416

[30] Foreign Application Priority Data
Mar. 14, 1974  Austria .............................. 2114/74

[52] U.S. Cl. ................... 52/753 D; 52/285; 52/589; 297/440
[51] Int. Cl.² .......................................... F16B 5/07
[58] Field of Search .......... 52/753 R, 753 C, 753 D, 52/753 K, 284, 285, 286, 589, 593; 297/440; 312/108, 111; 108/111; 211/148

[56] References Cited
UNITED STATES PATENTS
3,722,704   3/1973   Piretti ............................ 312/108 X
3,798,860   3/1974   Mason ................................ 52/285

*Primary Examiner*—Werner H. Schroeder
*Assistant Examiner*—Wayne L. Shedd
*Attorney, Agent, or Firm*—Wenderoth, Lind & Ponack

[57]  ABSTRACT

A system, used in the construction of furniture, is provided for joining at least two and at most four boards disposed at right-angles to each other, those end faces of the boards that face the zone where the joint is made being provided with interengaging toothed formations. The end faces of the boards to be joined are provided with raised portions, the cross-sections of the mutually contacting raised portions on four boards together forming a square. The raised portions comprise projections and recesses of a shape complementary to that of the projections and which extend into the raised portions and below and transverse to the projections.

10 Claims, 11 Drawing Figures

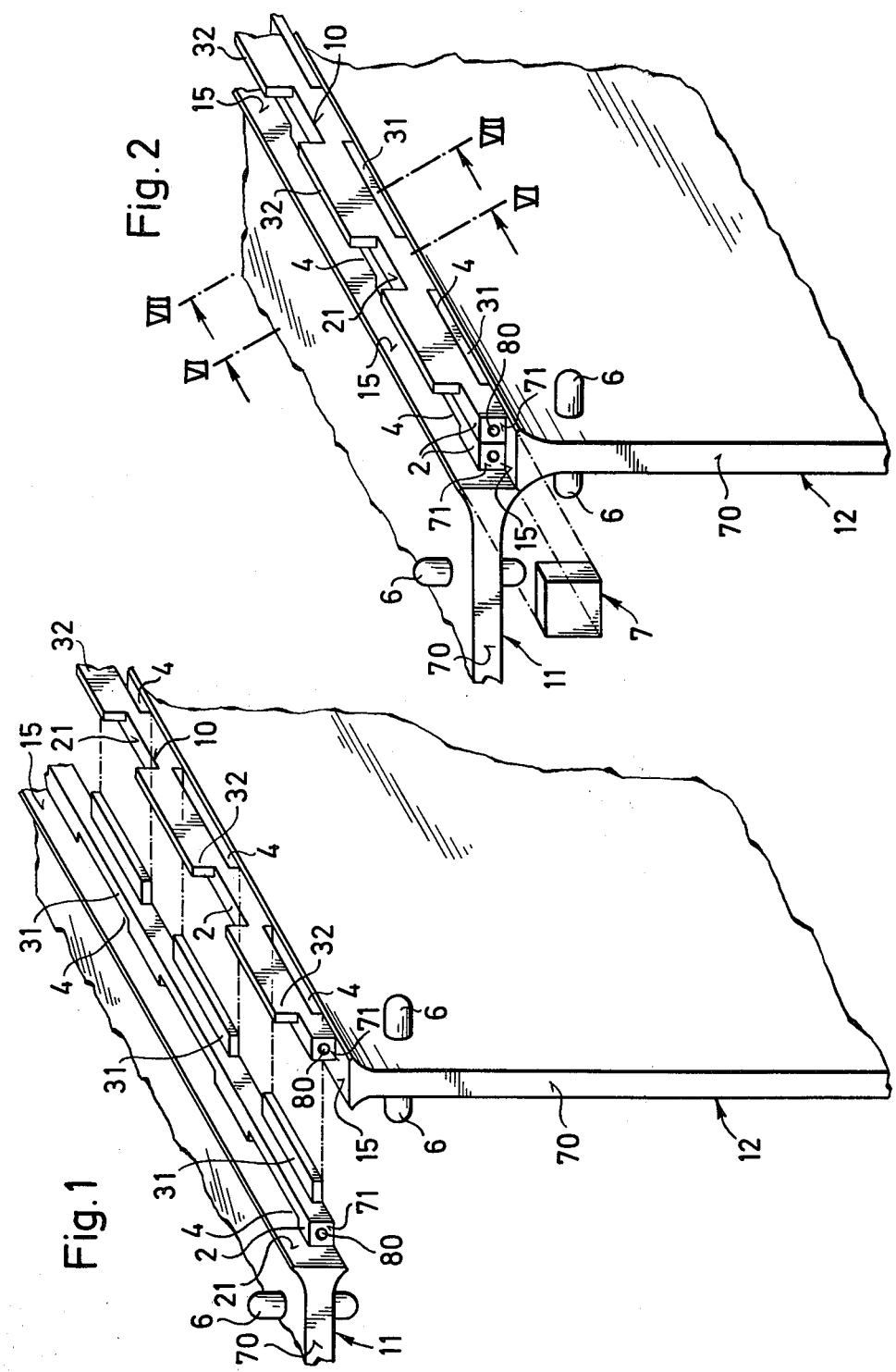

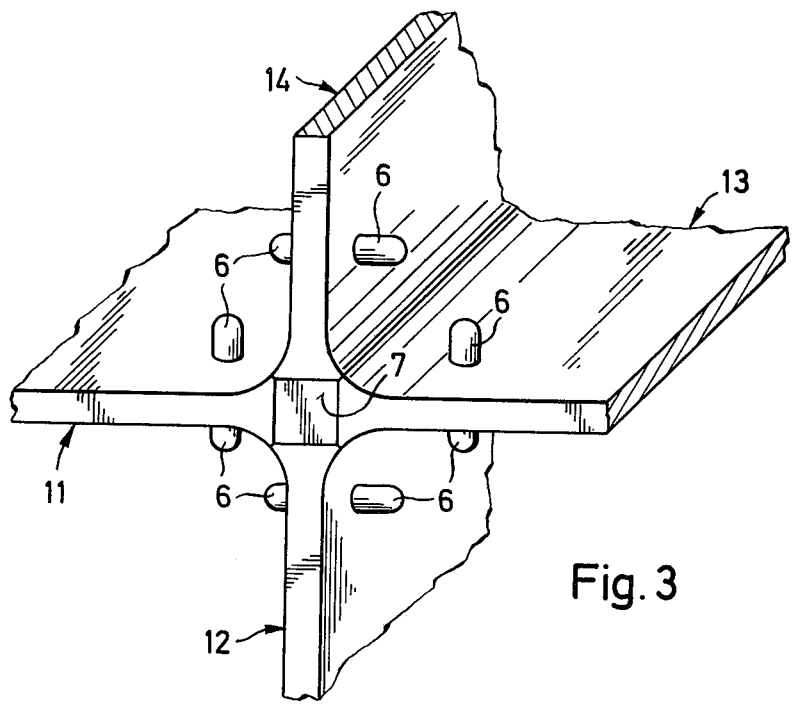
Fig. 3
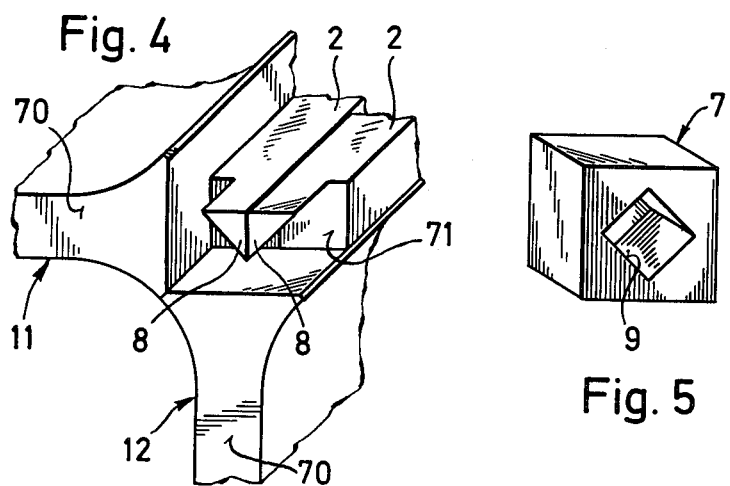
Fig. 4
Fig. 5

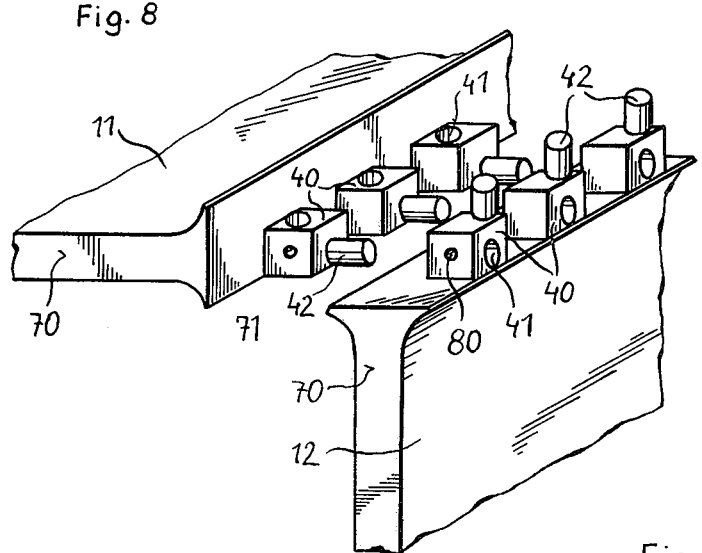
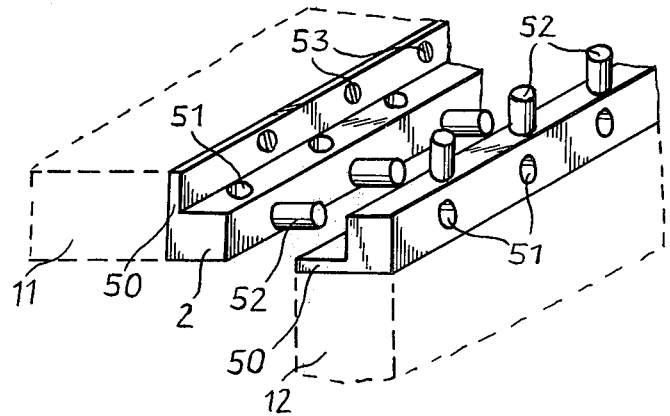

INTERKEYED PANEL EDGE CORNER JOINT

The invention relates to a system for joining at least two and at most four boards, used in the construction of furniture, disposed at right-angles to each other, those end-faces of the boards that face the zone where the joint is made being provided with interengaging toothed formations.

A jointing system of this kind has already been proposed in which the individual boards are provided with angled extensions and in which the cavity, which is formed between the end-faces of the boards and the inner faces of the extensions when two or more boards are joined, is filled with a bar and the boards are thus clamped together (see German Patent Specification AS No. 1 301 177). When boards of this kind are used, there arise difficulties in obtaining the correct thickness of the extensions. Furthermore, it is in practice only possible to join four boards by this system. A joint between only two boards can hardly be achieved with the required degree of stability, since in this case the bar cannot be guided over portions of its entire length and it can therefore deflect. A further disadvantage of this method of jointing resides in the fact that during assembly the four boards have to be held in the correct position while the connecting bar is being introduced. This however can hardly be achieved by a single fitter so that the cost of fitting becomes high.

The object of the present invention is to provide a system for joining two to four boards which exhibits the necessary stability even in those cases where only two boards, disposed at right-angles to each other, are to be interconnected. A further object is that of so designing the jointing system that the assembly of even four boards can be carried out without difficulty by a single fitter without the need for any special tools; instead, simple household tools can be used for the purpose. In addition, it is intended that unskilled persons should be able to make the joint.

According to the invention these objects are achieved in that the end-faces of the boards to be joined are provided with raised portions, the cross-sections of the mutually contacting raised portions on four boards together forming a square, and in that the raised portions comprise projections and recesses, whose shape is complementary to that of the projections and which extend into the raised portions and exactly below and transverse to the projections.

In an advantageous arrangement, the raised portions take the form of square strips which terminate at the edge of the board and have a front face, extending parallel to the end-face of the board, and a parallel inner face, extending parallel to the board. A continuous strip is not however essential, and it suffices to provide lengths of strip on the end-faces of the boards, which lengths of strip also have projections, in the form of tenons for example, and recesses, e.g. bores.

In addition however, it is also feasible to provide raised portions in the form of continuous or interrupted strips whose cross-section is in the form of an equilateral triangle for example, two sides of which each form an angle of 45° with the end-face of the board.

In a particularly advantageous embodiment of the invention, the projections take the form of fillets and end at the outer edge of the strip, and the recesses extend through the strips, each recess being delimited at one side by the end-face of the particular board.

Particular advantage accrues if outstanding portions or recessed portions are provided at the lateral edges of those end-faces of the raised portions that are presented to the board, these outstanding portions or recessed portions corresponding to recessed portions or outstanding portions formed in or on a connecting element which can be fitted on the end zone of the raised portions in the longitudinal direction of the joint. In this way the joint is reliably prevented from opening up.

The invention will now be described in greater detail by reference to the drawings.

Therein FIG. 1 shows two boards, forming parts of an item of furniture and provided with joint elements in accordance with the invention.

FIG. 2 shows two connected boards.

FIG. 3 illustrates four connected boards with a connecting element fitted thereto.

FIG. 4 shows an arrangement incorporating end tenons.

FIG. 5 illustrates a connecting element suitable for use in the arrangement shown in FIG. 4.

FIGS. 8 and 9 illustrate further possible embodiments of the invention, while

Figure 6:
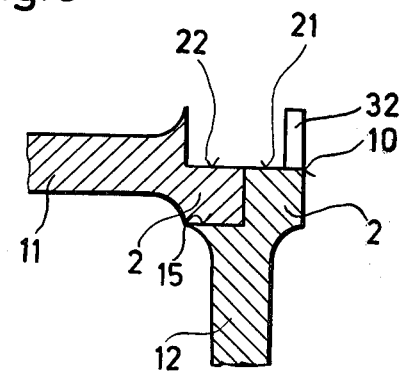
FIG. 6 is a section on line VI—VI of FIG. 2.

In the embodiment shown in FIGS. 1 to 7, the boards 11, 12, 13 and 14 are each provided at their end-faces 15 with a raised portion which takes the form of a continuous strip 2 terminating at the edge of the board; each strip has a front face 21 extending parallel to the end face 15, and an inner face 22 extending parallel to the board. On its front face 21 the strip 2 carries rectangular fillets 31, 32, which end at the outer edge 10 of the strip 2 and are of smaller width than this strip. Furthermore, formed in the strip 2 are openings 4 which correspond to the strips 31, 32 in cross-section and arrangement.

Figure 7:
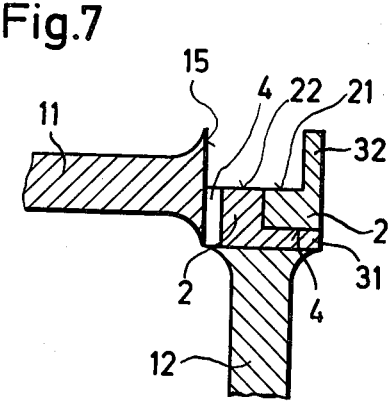
FIG. 7 shows a section on line VII—VII of FIG. 2.

Two or more boards are joined by inserting the fillets 31, 32 into the openings 4 in the strip 2 of each board to be fitted at right-angles, as shown in FIGS. 2 and 7. When this is done the strip 2 of one of the boards, i.e. the board 12, lies on the end-face 15 of the other board 11.

FIGS. 4 and 5 illustrate a particularly advantageous arrangement in which the end-faces 71 of the strips 2 that are presented to the lateral edges 70 have raised portions in the form of triangular tenons 8, four of these tenons 8 together forming a square. The ends of the strips 2 can therefore be readily held together by connecting elements 7 which can be fitted in the axial direction and each of which has a square hole 9.

The boards are also provided with tenons 6 which may serve both as latching means for the rear wall and as hinge pins for doors. Furthermore, they can be used for retaining front boards in position when the latter are provided with corresponding holes. Instead of using fillets 31, 32 and openings 4, the joint may of course also be made with the aid of tenons which are disposed on the front face or inner face of the main strip and which may engage in corresponding bores in the inner or front face. An arrangement of this kind is illustrated in FIG. 8 for example. Here the boards 11 and 12 are provided with raised portions in the form of lengths 40 of strip which correspond to the main strip 2 of the arrangement shown in FIGS. 1 to 7. The lengths 40 of strip are provided with tenons 42 and bores 41 which extend into the lengths 40 of strip transversely to the tenons. If two boards 11 and 12, disposed at right-angles to each other, are then fitted together, the tenons 42 on the board 11 extend into the bores 41 in the lengths 40 of strip on the board 12. If four boards are to be fitted together, the other two boards can likewise be interconnected and the two pairs of boards finally united.

Figure 10:
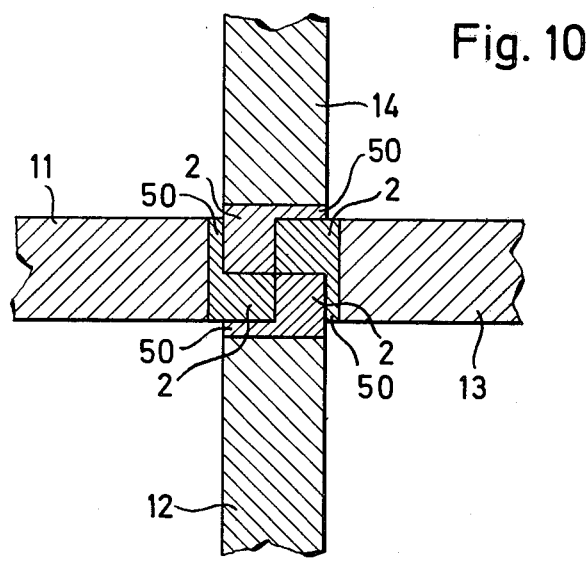
FIG. 10 illustrates a section through four boards connected by the means seen in FIG. 9.

In the arrangement illustrated in FIG. 9, the raised portions, which are in the form of strips 2 and have tenons 52 and bores 51, are not provided on the boards 11 and 12 but on strips 50 which in turn are connected to the boards 11 and 12 by screws 53 for example. FIG. 10 illustrates, in section, a means for joining four boards 11, 12, 13 and 14 provided with strips 50.

Figure 11:
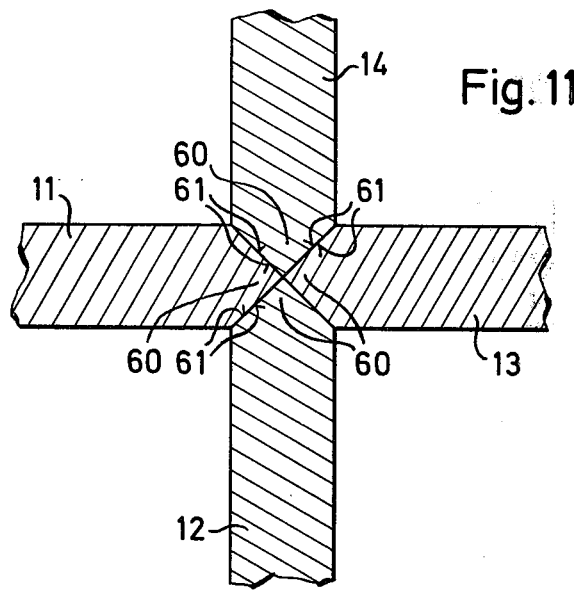
FIG. 11 illustrates a section through a further form of construction.

The raised portions provided on the end-faces of the boards 11, 12, 13 and 14 and having projections and recesses do not necessarily have to have faces extending parallel to the faces of the boards, as illustrated in FIGS. 1 to 10. As shown in FIG. 11, the raised portions may also be formed for example as strips 60 of triangular cross-section, and the projections and recesses, not illustrated, preferably extend at right-angles to the faces 61 of the strips 60.

The width of the strips 2 or the lengths 40 of strip may be greater or less than one-half of the width of the end-faces 15 of the boards, but the greatest stability in the joint is achieved with strips or lengths of strip whose width is equal to half the width of the end-faces of the boards.

The faces of the raised portions, e.g. the strips 2 or lengths 40 of strip, that face the lateral edges of the boards can also be of different form from that shown in FIG. 4. For example, bores 80 can be formed at the end-faces 71 of the strips 2 or of the outer lengths 40 of strip, and the tenons of a connecting element, which can be fitted in the axial direction, extend into these bores.

We claim:

1. A furniture joint comprising:
a plurality of boards, each said board having an end face, each said end face having extending therefrom a raised portion, each said raised portion having integral therewith and extending therefrom a plurality of projections, each said raised portion having therein a plurality of recesses having a configuration complementary to that of said projections, each said recess being aligned with and extending transverse to a respective said projection; and
said plurality of boards being arranged at right angles to each other, with said projections of each said board being extended into and received by said recesses of the next adjacent said board.

2. A furniture joint as claimed in claim 1, wherein said plurality of boards comprises four boards, and said raised portions of said four boards abut to form a square in cross-section.

3. A furniture joint as claimed in claim 1, wherein each said raised portion comprises a plurality of lengths positioned along the respective said end face, each said length having extending therefrom one of said projections and having extending therethrough one of said recesses.

4. A furniture joint as claimed in claim 1, wherein each said raised portion comprises a single strip of square cross-section extending along said end face of the respective said board, said single strip having a front face extending in a plane parallel to said end face, an inner face extending in a plane parallel to the plane of said board, and an outer face parallel to said inner face and adjacent an edge of said end face.

5. A furniture joint as claimed in claim 4, wherein each of said projections is in the form of a fillet-shaped member having a surface in the same plane as said outer face of the respective said single strip, and each said recess extends through the respective said single strip, each said recess being delimited on one side thereof by the respective said end face.

6. A furniture joint as claimed in claim 4, wherein each said projection and said recess has a circular cross-section.

7. A furniture joint as claimed in claim 1, wherein each of said raised portions has end faces which face in the same direction as lateral edges of the respective said boards, said end faces of said raised portions having first locking means, and further comprising a connecting element having second locking means engageable with said first locking means for holding said plurality of boards in position and for preventing disassembly thereof.

8. A furniture joint as claimed in claim 7, wherein said first locking means comprise recesses in said end faces of said raised portions, and said second locking means comprise projections in said connecting element.

9. A furniture joint as claimed in claim 7, wherein said first locking means comprise projections of triangular cross-section extending from said end faces of said raised portions, each of said triangular projections having a configuration such that, when said plurality of boards comprises four boards, the resultant four triangular projections together form a square.

10. A furniture joint as claimed in claim 9, wherein said second locking means comprises a square-shaped hole of a configuration complementary to said square formed by said four triangular projections.

* * * * *